United States Patent Office 3,293,114
Patented Dec. 20, 1966

3,293,114
METHOD OF FORMING PAPER CONTAINING GASEOUS FILLED SPHERES OF THERMOPLASTIC RESINS AND PAPER THEREOF
Duane L. Kenaga and Ralph M. Gooch, Midland, Mich., assignors to The Dow Chemical Company, Midland, Mich., a corporation of Delaware
No Drawing. Filed Apr. 3, 1964, Ser. No. 357,288
5 Claims. (Cl. 162—168)

This invention relates to an improved paper. It more particularly relates to an improved paper containing small plastic particules.

Paper has many uses in packaging, printing, preparation of containers, and the like. One of the basic shortcomings of conventional paper is its weight. The relatively high density of paper imposes a significant financial burden in shipping, mailing, and the like. For example, magazines, when printed on a paper which is sufficiently dense and thick to give the reader the impression of quality, weighs considerably more than is necessary if the minimum thickness of paper were used which would permit readability. Frequently among the thicker papers, often referred to as paperboard or boxboard, a relatively high weight is required to obtain a desired thickness and stiffness. In many instances, such as in the preparation of paper cups, present papers do not have a sufficient insulating value for use as hot cups unless an excessive quantity of pulp is employed.

It is an object of this invention to provide an improved paper having a low density and improved opacity per unit weight.

A further object of this invention is to provide an improved paper having a relatively high stiffness per unit weight.

Another object of this invention is to provide an improved paper which has low thermal conductivity per unit weight.

Still another object of the invention is to maintain tear strength while lowering the basis weight.

These benefits and other advantages in accordance with the present invention are achieved in the preparation of a paper by incorporating therein a plurality of synthetic resinous particles having a generally spherical shape and defining a generally concentric spherical cavity therein. Papers in accordance with the present invention are most readily prepared by the addition of from about 0.05–60 percent of hollow generally spherical particles by weight based upon the weight of the dry pulp, to the pulp slurry. Generally such plastic particles range in diameter from about one-half to about 200 microns in diameter. However, desirably such particles have diameters ranging from about 3 to about 50 microns and most advantageously have particle diameters of from about 5 to about 20 microns. Generally such particles have bulk density ranging from about 0.2 to 3 pounds per cubic foot. Oftentimes such particles are commercially available and are made from glass, phenolic plastics and urea formaldehyde. Most advantageously and beneficially such particles are prepared from thermoplastic resinous materials rather than thermosetting materials. The thermoplastic resinous materials generally are less brittle and are readily manipulated with a minimum breakage and can be prepared from polymers of widely differing physical properties. Such small hollow particles are prepared by the limited coalescence polymerization technique utilizing a polymerizable monomer and a volatile blowing agent, the blowing agent exhibiting limited solubility in the polymer. A typical preparation of such particles is as follows:

A polymerization reactor equipped with an agitator was charged with 100 parts of deionized water and 15 parts of a 30 weight percent colloidal silica dispersion in water. The colloidal silica dispersion was 30 weight percent solids and available under the trade name of "Ludox HS." To this mixture was added 2.5 parts of a 10 weight percent aqueous solution of a copolymer prepared from diethanol amine and adipic acid in equimolar proportions by carrying out a condensation reaction to give a product having a viscosity of about 100 centipoises at 25° centigrade. One part of a solution containing 2.5 weight percent potassium dichromate was added. The pH of the aqueous solution was adjusted to 4 with hydrochloric acid. Methyl methacrylate was utilized as the monomer. An oil phase mixture was prepared utilizing 100 parts of methyl methacrylate and containing 20 weight percent neopentane (27.6 volume percent based on the total volume of the monomer-neopentane mixture) and 0.1 part of benzoyl peroxide as a catalyst. The oil phase mixture was added to the water phase with violent agitation supplied by a blade rotating at a speed of about 10,000 r.p.m. The reactor was immediately sealed and a portion sampled to determine the particle size. The droplets appeared to have diameters of from about 2 to about 10 microns. After the initial dispersion, the reaction mixtures was maintained at a temperature of about 80° centigrade for a period of 24 hours. At the end of this period, the temperature was lowered and the reaction mixture had the appearance of a white, milky liquid similar to a chalk-white milk. A portion of the mixture was filtered to remove the particles and the particles or beads subsequently dried in an air oven at the temperature of about 30° centigrade. A portion of the dried spherical particles were heated in an air oven at a temperature of 150° centigrade for about 3 minutes. Upon heating, the particles showed a marked increase in volume. Microscopic examination of the particles prior to foaming indicated particles having diameters of from about 2 to about 10 microns and having disposed therein a distinct spherical zone which appeared to contain liquid and a small vapor space. The particles which had been heated were examined microscopically and were found to have diameters of from about 2 to 5 times the diameter of the original particle and to have a relatively thin, transparent wall and a gaseous center, i.e., a monocell.

By utilizing the principles of limited coalescence, a wide variety of expanded plastic particles may be attained.

These expanded particles are spherical in shape and have a concentric spherical cavity. The hollow spherical particles are readily incorporated into a paper pulp by admixture with the wet pulp prior to deposition on the Fourdrinier screen or on the collecting surface of a cylinder machine. Depending upon the particular surface characteristics of the thermoplastic resinous particle, it may be necessary to incorporate a coagulant or retention aid into the pulp slurry to assure that a major portion of the plastic particles are deposited on the surface of the pulp fibers and are not carried away by the white water.

Generally the plastic particles are utilized in a paper in concentrations of from about 0.05–60 percent by weight depending upon the desired characteristics of the resultant paper. If papers of minimum bulk density are desired, a maximum quantity of particles are incorporated therein. If maximum physical strength is desired, generally lower quantities are used. Beneficially the incorporation of from about 5–15 percent by weight of such plastic particles is oftentimes sufficient to reduce the density of a paper sufficiently to provide a significant decrease in the cost of mailing of a finished printed article such as a magazine or a book. Yet all of the required physical characteristics of the paper are retained. The particles or microspheres employed in the present invention are readily incorporated in either long fiber or short fiber pulps, and also in ground wood pulps and rag pulps. The incorporation of the plastic particles provides on an equal basis weight comparison a significant increase in the stiffness of the paper as well as a significant increase in the caliper. Thus, it makes possible the preparation of papers having greater stiffness, lighter weight, and having increased caliper, all desirable features for many books, magazines, and the like.

The following experiments serve to illustrate the benefits and advantages of the present invention and employ the following terms:

Freeness of pulp is a measure of the rate of flow of water through the pulp and is measured in accordance with the Tappi Standard T227 $m$–58, also referred to as the Canadian Standard Freeness.

Stiffness of the paper or sheets is measured in accordance with the Tappi Standard T489 $m$–60. Ring crush refers to the Ring crush test of paperboard in accordance with the Tappi Standard T472 $m$–51. The Pick test is designed to test the surface strength of paper performed in accordance with Tappi test T459 $m$–48. The equipment employed for forming hand sheets was generally in accord with that described in the Tappi Standard "Forming Hand Sheets for Physical Tests of Pulp" T205 $m$–58. Hand sheets were prepared by beating the pulp to the desired degree of freeness and subsequently adding the hollow particulate particles to the pulp slurry and transferring the slurry to the deckel box and subsequently draining the water from the deckel box after any obvious movement of the slurry had ceased. The hand sheet was formed on an 80 mesh screen and subsequently dried by the following procedure. The hand sheet and screen are removed from the deckel box, the sheet pressed against and transferred to a sheet of blotting paper. The sheet was then placed against a polished chromium plated sheet under a pressure of about 60 pounds per square inch for a sufficient length of time to remove by capillary action the majority of water available thereto. The sheet of blotting paper is removed and replaced with a half inch felt. The felt-paper-plated sheet sandwich is placed in a platen press between closed platens for a period of 4 minutes. The platen adjacent the plated sheet was heated to a temperature of 115° centigrade. The hand sheet was then removed from the press and sandwiched and conditioned for 24 hours at a temperature of 73° centigrade under a relative humidity of 50 percent before testing. The experimental data obtained from the experiments are set forth in the following tables, wherein the microspheres are polymethyl methacrylate prepared in the manner hereinabove described.

TABLE I

|  | Control | | A[1]+10% Microspheres | | Cato 8[2]+10% Microspheres | |
|---|---|---|---|---|---|---|
|  | | | 0.5% A[1] | 0.75% A[1] | 1% Cato 8 | 3% Cato 8 |
| Basis Weight, gm./m.$^2$ | 70.3 | 57.6 | 57.6 | 57.6 | 57.6 | 57.6 |
| Percent Microspheres Retained | | | 3.0 | 2.9 | 3.7 | 4.1 |
| Bulk, cc./gm | 1.28 | 1.38 | 1.56 | 1.62 | 1.55 | 1.57 |
| Caliper in inches | 0.0035 | 0.0031 | 0.0037 | 0.0038 | 0.0038 | 0.0039 |
| Tappi Opacity, percent | 86.8 | 78.8 | 87.6 | 89.2 | 88.6 | 88.9 |
| Brightness, $R_\infty$ | 0.627 | 0.620 | 0.689 | 0.691 | 0.689 | 0.688 |
| Burst Factor | 35.8 | 30.3 | 28.7 | 26.8 | 27.6 | 27.8 |
| Tensile, length to break | 6,330 | 6,560 | 6,130 | 5,750 | 6,090 | 6,400 |
| Tensile, p.s.i | 6,400 | 6,350 | 5,390 | 4,770 | 5,150 | 5,460 |
| Tear Factor | 69.7 | 48.5 | 60.7 | 56.8 | 54.9 | 62.5 |
| M.I.T. Fold | 27 | 35 | 64 | 90 | 73 | 280 |

[1] A—A copolymer of 80 parts acrylonitrile and 20 parts by weight 2-aminoethyl methacrylate.
[2] Cato 8—A cationic starch manufactured by National Starch Company.

Opacity is measured in accordance with Tappi Standards T425 $m$–60 with the exception that a wave length of 560 millimicrons was used. Burst factor was determined in accordance with Tappi Standard T403 $m$–53; the length to break is the length in meters of a sheet of paper sufficient to cause the paper to rupture. The tear factor was determined by Tappi Standard T414 $m$–49. The M.I.T. fold was determined in accordance with Tappi Standard T423 $m$–50.

|  | Control+3% Alum[2] | | | 10% Microspheres+ Mydel 550[1]+3% Alum | |
|---|---|---|---|---|---|
|  | | | +10% Microspheres | 0.5% Mydel 550 | 0.75% Mydel 550 |
| Basis weight, g./m.$^2$ | 70.3 | 57.6 | 57.6 | 57.6 | 57.6 |
| Percent Microspheres Retained | | | 3.1 | 3.7 | 4.3 |
| Bulk, cc./gm | 1.31 | 1.40 | 1.61 | 1.61 | 1.64 |
| Caliper in inches | 0.0036 | 0.0032 | 0.0037 | 0.0039 | 0.0040 |
| Tappi Opacity, percent | 86.4 | 79.2 | 86.8 | 87.8 | 87.8 |
| Brightness, $R_\infty$ | 0.638 | 0.630 | 0.688 | 0.697 | 0.697 |
| Burst Factor | 34.9 | 26.1 | 23.5 | 31.5 | 26.7 |
| Tensile, length to break | 6,340 | 6,580 | 5,570 | 5,830 | 6,100 |
| Tensile, p.s.i | 6,400 | 6,400 | 4,530 | 4,820 | 4,850 |
| Tear Factor | 68.4 | 49.9 | 63.5 | 54.1 | 56.9 |

[1] Mydel 550 a copolymer of acrylamide and acrylic acid.
[2] Aluminum Sulphate $Al_2(SO_4)_3 18H_2O$.

TABLE III

|  | Untreated Control | Alum Control 3% | 3% Alum+A* | 3% Alum+A* | 0.5% Rosin+Alum | | |
|---|---|---|---|---|---|---|---|
|  |  |  |  |  | Control | A* | A* |
| Basis Weight, corrected to grams/sq. meter | 41.6 | 41.6 | 41.6 | 41.6 | 41.6 | 41.6 | 41.6 |
| Microspheres Added, percent | -------- | -------- | 5 | 10 | -------- | 5 | 10 |
| Analysis of Microspheres y Pyrolysis | 0 | 0 | 1.1 | 2.1 | 0 | 1.0 | 2.2 |
| Bulk, cc./gms. (Average) | 1.92 | 1.96 | 2.00 | 2.24 | 2.00 | 2.14 | 2.20 |
| Caliper, (Average) inches | .0032 | .0033 | .0034 | .0039 | .0033 | .0037 | .0039 |
| Dry Burst Factor | 12.1 | 11.5 | 10.1 | 9.7 | 9.4 | 8.9 | 8.3 |
| Tappi Opacity, percent | 72.3 | 76.2 | 76.2 | 81.3 | 76.0 | 79.0 | 81.1 |
| Brightness, R∞ | .710 | .741 | .743 | .767 | .743 | .772 | .770 |
| Tensile, length to break | 4,200 | 3,800 | 3,400 | 3,000 | 3,400 | 3,200 | 3,100 |
| Tear Factor | 79 | 76 | 82 | 92 | 78 | 89 | 90 |
| M.I.T. Fold | 7.3 | 6.3 | 4.5 | 3.8 | 4.5 | 3.8 | 4.0 |
| Tensile, lbs./sq. in | 3,000 | 2,800 | 2,400 | 1,900 | 2,400 | 2,100 | 2,000 |
| M. of E. x 1,000 | 360 | 330 | 300 | 240 | 320 | 280 | 260 |

NOTE.—A*, See Table V.

TABLE IV

[0.5% Rosin+Alum]

|  | Control | A* | A* | B* | B* | C* | C* | C* | Control |
|---|---|---|---|---|---|---|---|---|---|
| Basis Weight, Corrected to grams/sq. meter | 41.6 | 41.6 | 41.6 | 41.6 | 41.6 | 41.6 | 41.6 | 41.6 | 41.6 |
| Microspheres Added, percent | -------- | 5 | 10 | 5 | 10 | 2.5 | 5 | 10 | -------- |
| Analysis of Microspheres by Pyrolysis | 0 | 1.0 | 2.2 | 1.4 | 2.7 | 0.4 | 1.0 | 2.0 | 0 |
| Bulk, cc./gm. (Avg.) | 2.00 | 2.14 | 2.20 | 2.18 | 2.62 | 1.95 | 2.18 | 2.15 | 1.88 |
| Caliper, (Avg.) inches | .0033 | .0037 | .0039 | .0038 | .0046 | .0033 | .0037 | .0037 | .0032 |
| Dry Burst Factor | 9.4 | 8.9 | 8.3 | 9.6 | 8.4 | 9.9 | 9.6 | 9.7 | 10.6 |
| Tappi Opacity, percent | 76.0 | 79.0 | 81.1 | 74.8 | 75.9 | 74.1 | 77.0 | 75.4 | 73.6 |
| Brightness, R∞ | .743 | .772 | .770 | .738 | .746 | .733 | .744 | .739 | .732 |
| Tensile, Length to Break | 3,400 | 3,200 | 3,100 | 3,400 | 2,800 | -------- | -------- | -------- | -------- |
| Tear Factor | 78 | 89 | 90 | 83 | 92 | -------- | -------- | -------- | -------- |
| M.I.T. Fold | 4.5 | 3.8 | 4.0 | 4.0 | 2.8 | -------- | -------- | -------- | -------- |
| Tensile, Pounds per sq. inch | 2,400 | 2,100 | 2,000 | 2,200 | 1,500 | -------- | -------- | -------- | -------- |
| M. of E. x 1,000 | 320 | 280 | 260 | 290 | 200 | -------- | -------- | -------- | -------- |

NOTE.—A*, B*, C*, See Table V.

TABLE V.—PHYSICAL PROPERTIES OF MICROSPHERES

| Microsphere Batch | Bulk Density | Diameter in Microns | | |
|---|---|---|---|---|
|  |  | Small | Average | Large |
| A | 4.3 | 2 | 10 | 15 |
| B | 2.3 | 7 | 20 | 147 |
| C | 3.9 | 7 | 20 | 107 |

Paper containing small hollow plastic particles or microspheres was prepared on an experimental paper machine of the Fourdrinier type utilizing the following material. The furnish or solids in the pulp slurry comprises 50 percent by weight unbleached groundwood pulp, 35 percent by weight bleached sulfite pulp and 15 percent by weight bleached kraft. The furnish was beaten to a Canadian Standard freeness of 300 milliliters. After beating one-half of one percent by weight based on the dry weight of the furnish of a rosin size was added. The pH of the resultant slurry was 6.2 which was subsequently adjusted to a pH of 4.5 by means of sulphuric acid in the stock and machine chests. During operation, the pH at the fan pump varied between 5.1 and 5.5. A slurry in water of hollow plastic particles having a diameter of from about 7 microns to about 110 microns was prepared and metered into the recycle water going to the fan pump. The paper machine was placed in operation without the addition of the hollow plastic particles. After operating for a period of time the quantity of plastic spheres added to the stock was varied. The results are set forth in the following tables.

TABLE VI

|  | Initial Control | Microspheres Added | | | | Final Control |
|---|---|---|---|---|---|---|
|  |  | 2.7% | 4.6% | 10.2% | 12.1% |  |
| Basis Weight, corrected to gram/sq. meter | 41.6 | 41.6 | 41.6 | 41.6 | 41.6 | 41.6 |
| Analysis of Microspheres by Pyrolysis | 0 | 0.5 | 1.1 | 1.7 | 2.3 | 0 |
| Bulk cc./gm. (Average) | 2.30 | 2.48 | 2.52 | 2.65 | 2.71 | 2.33 |
| Dry Burst Factor | 7.2 | 6.9 | 6.1 | 5.8 | 5.4 | 7.0 |
| Tappi Opacity, percent | 76.2 | 77.5 | 76.7 | 78.7 | 78.2 | 76.1 |
| Brightness, R∞ | .712 | .719 | .721 | .724 | .724 | .718 |
| Tensile, length of break, Machine direction | 2,900 | 3,000 | 2,600 | 2,400 | 2,200 | 3,100 |
| Tensile, length to break, Cross Machine direction | 2,200 | 2,200 | 2,100 | 1,900 | 1,800 | 2,000 |
| Tear Factor, Machine direction | 45 | 45 | 47 | 46 | 44 | 47 |
| Tear Factor, Cross Machine direction | 47 | 47 | 49 | 49 | 45 | 47 |
| M.I.T. Fold (0.5 Kg.), Machine direction | 38 | 31 | 23 | 20 | 15 | 41 |
| M.I.T. Fold (0.5 Kg.), Cross Machine direction | 22 | 17 | 14 | 13 | 14 | 13 |
| Tensile lbs./sq. in., Machine direction | 1,700 | 1,700 | 1,500 | 1,300 | 1,100 | 1,900 |
| Tensile lbs./sq. in., Cross Machine direction | 1,300 | 1,200 | 1,200 | 1,000 | 900 | 1,200 |

TABLE VII.—K AND N INK TEST, PERCENT DROP IN BRIGHTNESS

|  | Initial Control | Percent Microspheres Added | | | | Final Control |
|---|---|---|---|---|---|---|
|  |  | 2.7 | 4.6 | 10.1 | 12.1 |  |
| Condition 1 | 52 | 52 | 53 | 52 | 52 | 52 |
| Condition 2 | 49 | 48 | 50 | 48 | 50 | 49 |
| Condition 3 | 35 | 36 | 38 | 38 | 37 | 38 |
| Condition 4 | 21 | 29 | 26 | 28 | 32 | 38 |

IGT PICK, 2# INK, FEET/MINUTE

| Condition 1 | 328 | 353 | 530 | 370 | 348 | 325 |
|---|---|---|---|---|---|---|
| Condition 2 | 180 | 140 | 188 | 198 | 205 | 193 |
| Condition 3 | 358 | 273 | 243 | 283 | 293 | 310 |
| Condition 4 | 473 | 405 | 353 | 388 | 325 | 278 |

Condition 1=Uncoated, unsupercalendered sample.
Condition 2=Uncoated, supercalendered 6 nips.
Condition 3=Coated, with coating color Number 1, supered 6 nips.
Condition 4=Coated, with coating color Number 2, supered 6 nips.

By way of further illustration, a plurality of hand sheets were prepared in a manner hereinbefore described utilizing a 1:1 mixture of bleached groundwood pulp and an unbleached spruce sulfite pulp beaten to a Canadian Standard freeness of 157 milliliters; the hand sheets were made up to a basis weight of about 120 grams per square meter. Three percent by weight based on the weight of the pulp of alum was added and the pH adjusted to 5.2 by means of $N/10$ NaOH.

The plastic spheres are identified by the following designations: A at a bulk density of 3.4 pounds per cubic foot; D at a density of .5 pound per square cubic foot; E at a density of about .7 pound per cubic foot and F at at a density of about .9 pound per square foot. The results are set forth in the following tables.

TABLE VIII

| Treatment | Control | 5% A | 10% A | 5% E | 10% E |
|---|---|---|---|---|---|
| Percent Microspheres Retained |  | 2.4 | 5.0 | 2.2 | 5.4 |
| Basis Weight, g./m.$^2$ | 118.4 | 124.5 | 128.7 | 125.6 | 128.7 |
| Caliper, inches | 0.0070 | 0.0082 | 0.0093 | 0.0109 | 0.0152 |
| Bulk, cc./gm | 1.51 | 1.66 | 1.84 | 2.19 | 3.00 |
| Percent increase over control |  | 10 | 22 | 45 | 99 |
| Taber Stiffness | 1.09 | 1.44 | 1.83 | 2.28 | 4.03 |
| Percent increase over control |  | 30.3 | 67.9 | 109.2 | 269.7 |
| Gurley Stiffness | 1.79 | 2.25 | 3.12 | 3.84 | 6.22 |
| Percent increase over control |  | 25.7 | 74.9 | 114.5 | 247.5 |
| Ring Crush, 50, Relative Humidity | 21.70 | 24.19 | 25.68 | 31.19 | 38.08 |
| Percent increase over control |  | 11.4 | 18.3 | 43.7 | 75.4 |
| Ring Crush, high, Humidity | 16.55 | 18.19 | 21.01 | 21.89 | 24.86 |
| Percent increase over control |  | 9.9 | 26.9 | 32.3 | 50.2 |
| Modulus of Elasticity ×10$^4$ | 55.7 | 46.6 | 39.9 | 31.4 | 20.2 |
| Tensile, p.s.i | 4,614 | 3,997 | 3,401 | 2,869 | 1,966 |
| Tensile, breaking length, meters | 4,809 | 4,667 | 4,338 | 4,422 | 3,934 |

E=polymethyl methacrylate spheres 20 to 25 microns average diameter and having a bulk density of 0.6 pound per cubic foot.

TABLE IX

| Treatment | Control | 5% A | 10% A | 5% E | 10% E |
|---|---|---|---|---|---|
| Stiffness calculated from M.O.E. (×10$^4$). D=EI. Where I=bh$^2$/12 (h=caliper) | 159 | 214 | 267 | 339 | 591 |
| Percent increase over control |  | 35 | 68 | 113 | 272 |
| Stiffness calculated on basis of statement that stiffness increases as square of caliper at constant weight |  | 2.22 | 2.70 | 3.88 | 7.16 |
| Percent increase over control |  | 24 | 51 | 117 | 300 |
| Gurley stiffness, direct reading | 1.79 | 2.25 | 3.12 | 3.84 | 6.22 |
| Percent increase over control |  | 25.7 | 74.9 | 114.5 | 247.5 |
| Taber stiffness, direct reading | 1.09 | 1.44 | 1.83 | 2.28 | 4.03 |
| Percent increase over control |  | 30.3 | 67.9 | 109.2 | 269.7 |

A plurality of hand sheets were prepared generally in accordance with the foregoing procedures utilizing a spruce groundwood pulp which was beaten to a Canadian Standard Freeness of 121 milliliters. The slurry was treated with 2 percent by weight alum based on the dry weight of the pulp and the pH of the resultant slurry adjusted to about 5.3. A plurality of control sheets were prepared varying in weight in order that comparison might be made with two different samples of microspheres having densities of 0.418 and 0.829 pound per cubic foot respectively. The results are set forth in the following table.

weight alum based on the weight of the pulp was added to the slurry. A pH was adjusted between 5 and 5.5 and vary quantities of expanded polymethyl methacrylate microspheres having a bulk density of 0.829 pound per cubic foot were added to the pulp slurry immediately prior to formation of the hand sheets. The results are set forth in the following table.

TABLE XI

|  | Alum Control | Percent Microspheres |  |  |  |  |
|---|---|---|---|---|---|---|
|  |  | 2 | 4 | 6 | 8 | 10 |
| Percent Microspheres added | 0 | 2 | 4 | 6 | 8 | 10 |
| Percent Retention of Microspheres | 0 | 0.8 | 1.6 | 2.4 | 3.7 / 4.0 / 4.2 | 4.7 |
| Bulk, cc./gm. average | 1.36 | 1.43 | 1.50 | 1.60 | 1.72 | 1.85 |
| Caliper, average inches | 0.0127 | 0.0132 | 0.0141 | 0.0154 | 0.0167 | 0.0185 |
| Basis Weight, gms./sq. meter | 237 | 234 | 240 | 244 | 246 | 254 |
| Tensile, lbs./sq. inch | 5,660 | 5,860 | 5,250 | 4,800 | 4,580 | 4,270 |
| Tensile, Breaking length, meters | 5,400 | 5,870 | 5,520 | 5,390 | 5,540 | 5,550 |
| Modulus of Elasticity×$10^3$ | 583 | 574 | 512 | 451 | 402 | 349 |
| Ring Crush, lbs | 119 | 122 | 116 | 110 | 112 | 111 |
| Gurley Stiffness (corrected to 1″ x 3″ sample) | 5,140 | 5,030 | 6,180 | 6,490 | 7,130 | 8,910 |
| Percent Increase over control |  | −2 | 21 | 27 | 39 | 75 |

A plurality of hand sheets were prepared in a manner similar to the foregoing illustration with the exception that bleached kraft was employed as the pulp and was beaten to a Canadian Standard Freeness of 400 milliliters.

TABLE X

| Density lbs./ft.$^3$ | Percent Microspheres | | Weight, gm./m.$^2$ | Caliper Inches | Gurley Stiffness | Tensile p.s.i. | Wax Pick | |
|---|---|---|---|---|---|---|---|---|
|  | Added | Retained |  |  |  |  | No Rupture | Complete Rupture |
| Control | 0 | 0 | 143 | 0.0093 | 2.03 | 17.8 | 7A | 9A |
| Do | 0 | 0 | 156 | 0.0098 | 2.83 | 20.8 |  |  |
| Do | 0 | 0 | 165 | 0.0104 | 3.47 | 22.1 | 8A | 11A |
| Do | 0 | 0 | 175 | 0.0111 | 4.23 | 23.0 |  |  |
| Do | 0 | 0 | 185 | 0.0113 | 4.85 | 25.3 | 8A | 11A |
| Do | 0 | 0 | 196 | 0.0117 | 5.78 | 26.6 |  |  |
| Do | 0 | 0 | 207 | 0.0130 | 7.15 | 27.1 | 9A | 11A |
| 0.418 | 2.0 | 0.8 | 146 | 0.0102 | 2.80 | 18.7 |  |  |
| 0.418 | 4.0 | 1.9 | 144 | 0.0116 | 3.43 | 17.0 |  |  |
| 0.418 | 6.0 | 2.8 | 149 | 0.0127 | 4.00 | 18.9 | 6A | 8A |
| 0.418 | 8.0 | 3.6 | 148 | 0.0136 | 4.58 | 17.2 |  |  |
| 0.418 | 10.0 | 4.2 | 156 | 0.0150 | 5.60 | 16.5 | 5A | 7A |
| 0.829 | 2.0 | 1.0 | 145 | 0.0102 | 2.92 | 18.8 |  |  |
| 0.829 | 4.0 | 2.0 | 148 | 0.0123 | 4.13 | 18.4 |  |  |
| 0.829 | 6.0 | 3.1 | 152 | 0.0137 | 4.85 | 16.2 | 7A | 9A |
| 0.829 | 8.0 | 4.1 | 153 | 0.0150 | 5.75 | 17.9 |  |  |
| 0.829 | 10.0 | 5.8 | 155 | 0.0171 | 6.75 | 16.3 | 6A | 7A |

A plurality of hand sheets were prepared in a manner generally similar to the foregoing illustration wherein a southern pine unbleached kraft pulp was beaten to a Canadian Standard Freeness of 485 milliliters. Two percent by weight alum based on the dry weight of the pulp was added to the slurry. A pH was adjusted between 5 and 5.5 and vary quantities of expanded polymethyl methacrylate microspheres having a bulk density of 0.829 pound per cubic foot were added to the pulp slurry immediately prior to formation of the hand sheets. Polymethyl methacrylate microspheres having diameters of from about 3 to about 130 microns (number average 20) and a bulk density of 0.82 pound per cubic foot were employed. The results are set forth in the following table.

TABLE XII

| Percent [1,3] Added | Basis Wt. g./m.$^2$ | Bulk cc./g. | Burst Factor | Gurley Stiffness | Temp.° C.[2] Reached | Caliper mils. |
|---|---|---|---|---|---|---|
| 0 | 79.5 | 1.6 | 53 | 176 | 82 | 4.9 |
| 5 | 77.3 | 1.7 | 52 | 213 | 82 | 5.1 |
| 10 | 85.4 | 1.9 | 50 | 434 | 80 | 6.5 |
| 15 | 87.4 | 2.3 | 48 | 805 | 76 | 8.0 |
| 20 | 89.1 | 2.8 | 43 | 1,140 | 73 | 9.9 |
| 25 | 79.9 | 3.5 | 33 | 979 | 68 | 10.9 |
| 30 | 92.3 | 3.7 | 36 | 1,510 | 64 | 13.4 |
| 0 | 157.6 | 1.4 | 113 | 1,310 | 80 | 8.6 |
| 5 | 166.1 | 1.6 | 107 | 2,380 | 78 | 10.5 |
| 10 | 167.9 | 1.9 | 104 | 2,940 | 73 | 12.6 |
| 15 | 175.2 | 2.2 | 99 | 3,400 | 67 | 15.1 |
| 20 | 175.9 | 2.9 | 85 | 5,750 | 61 | 20.2 |
| 25 | 170.3 | 3.3 | 79 | 7,200 | 57 | 22.0 |
| 30 [4] | 187.9 | 3.6 | 71 | 6,970 | 54 | 26.3 |

[1] gms. of microspheres added per 100 gms. fiber, bl. kraft, 400 C.S.F.
[2] Temp., ° C., after one minute on hot plate, surface temp., 86° C.
[3] 2% alum added in each case.
[4] 17.4% retained (30/130=24% added) 72% retention.

Hand sheets were prepared in accordance with the hereinbefore delineated procedure wherein microspheres of various compositions were employed. The microspheres were added at levels of 5 and 10 parts by weight per 100 parts by weight fiber together with two percent by weight alum. The results are set forth in the following table.

TABLE XIII

| Microspheres used | Composition | Basis Wt. g./m.² | Bulk cc./g. | Burst Factor | Gurley Stiffness | Temp.[1] Reached | Caliper mils. |
|---|---|---|---|---|---|---|---|
| Alum control [2] | | 157.3 | 1.47 | 108 | 1,370 | 80 | 9.1 |
| 5% | Methylmethacrylate (Avg. dia. 20 microns, bulk density 0.82 lbs./cu. ft.). | 154.1 | 1.62 | 116 | 1,980 | 77 | 9.8 |
| 10% | | 141.8 | 1.99 | 102 | 1,980 | 74 | 11.1 |
| 5% | 95/5 methylmethacrylate/acrylonitrile (Avg. dia. 13 microns, bulk density 0.25 lbs./cu. ft.). | 161.3 | 2.02 | 109 | 2,590 | 73 | 12.8 |
| 10% | | 157.8 | 2.85 | 91 | 4,820 | 63 | 17.7 |
| 5% | 70/30 styrene/acrylonitrile (Avg. dia. 20 microns, bulk density 2.2 lbs./cu. ft. | 153.8 | 1.70 | 116 | 2,110 | 77 | 10.3 |
| 10% | | 165.9 | 2.14 | 95 | 3,600 | 71 | 14.0 |
| 5% | 70/30 styrene/acrylonitrile (Avg. dia. 27 microns, bulk density 1.1 lbs./cu. ft. | 160.7 | 2.04 | 87 | 2,590 | 72 | 12.9 |
| 10% | | 167.9 | 2.68 | 87 | 5,490 | 65 | 17.7 |
| 5% | Methylmethacrylate (Avg. dia. 3 microns) | 154.3 | 1.48 | 111 | 1,400 | 79 | 9.0 |
| 10% | | 157.4 | 1.42 | 119 | 1,270 | 79 | 8.6 |

[1] After one minute on hot plate, surface temp., 86° C.
[2] Two percent by weight alum (based on pulp) used in all cases.

In a manner similar to the foregoing illustrations other papers having generally commensurate benefits are prepared which contain expanded hollow plastic particles of a copolymer of 80 weight percent methyl methacrylate, and 20 weight percent styrene; 90 weight percent methyl methacrylate, 10 weight percent ethyl methacrylate; 70 weight percent methyl methacrylate, 30 weight percent ethyl methacrylate; 50 weight percent methyl methacrylate, 50 weight percent ethyl methacrylate; 40 weight percent methyl methacrylate, 60 weight percent ethyl methacrylate; 10 weight percent methyl methacrylate, 90 weight percent ethyl methacrylate; 90 weight percent methyl methacrylate, 10 weight percent ortho-chloro styrene; 70 weight percent methyl methacrylate, 30 weight percent orthochlorostyrene; 50 weight percent methyl methacrylate, 50 weight percent ortho-chlorostyrene; 10 weight percent methyl methacrylate, 90 weight percent orthochlorostyrene; polyortho-chlorostyrene; polyvinylbenzyl chloride; 70 weight percent acrylonitrile, 30 weight percent vinylidene chloride; equal portions of acrylonitrile and vinylidene chloride; 90 weight percent methyl methacrylate, 10 weight percent acrylonitrile; 50 weight percent methyl methacrylate, 50 weight percent acrylonitrile; 70 weight percent methyl methacrylate, 30 percent by weight para-tert.-butyl styrene; 80 weight percent methyl methacrylate, 20 weight percent vinyl acetate; 90 weight percent methyl methacrylate, 10 weight percent butyl acrylate; 98 weight percent styrene, 2 weight percent methacrylic acid; 83 weight percent styrene, 2 weight percent methacrylic acid and 15 weight percent of vinylbenzyl chloride; 91 weight percent vinylidene chloride, 9 weight percent acrylonitrile; and the like.

Papers prepared in accordance with the invention employing thermoplastic resinous particles emboss readily with relatively low pressure. Exceptionally desirable embossed papers are obtained wherein the embossed area of the paper is embossed at a temperature about or above the softening temperature of the plastic particles.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A paper comprising paper making fibers having incorporated therein a plurality of synthetic resinous thermoplastic particles, each of the synthetic resinous particles having a generally spherical shape and defining a generally spherical gaseous space therein, the synthetic resinous particles being present in a proportion from about 0.5 to about 60 percent by weight of the weight of the paper making fibers in the paper and each of the resinous particles having a diameter of from about 0.5 to about 200 microns.

2. The paper of claim 1 wherein the thermoplastic resinous particles have a diameter of from about 3 to about 50 microns.

3. The paper of claim 1 wherein the thermoplastic particles are polymethyl methacrylate.

4. In a method for making paper which comprises depositing paper making fibers upon a screen from an aqueous suspension and subsequently drying and compressing the deposited fibers to form a generally continuous sheet, the improvement which comprises incorporating within the aqueous suspension from which the fibers are deposited a plurality of synthetic resinous particles, each particle having a generally spherical shape and defining a generally spherical gaseous space therein and retaining in the resultant fibrous sheet at least a portion of the synthetic resinous thermoplastic particles, the resinous particles being present in a proportion of from about 0.5 to about 60 percent by weight of the weight of the paper making fibers and each of the particles having a diameter of from about 0.5 to about 200 microns.

5. The method of claim 4 wherein the thermoplastic particles are polymethyl methacrylate.

References Cited by the Examiner

UNITED STATES PATENTS

| 2,972,554 | 2/1961 | Muskat et al. | 260—2.5 X |
| 3,037,903 | 6/1962 | Bauman et al. | 162—101 X |
| 3,067,482 | 12/1962 | Hollowell | 260—2.5 X |
| 3,137,631 | 6/1964 | Soloway. | |
| 3,210,239 | 10/1965 | Eberl et al. | 162—101 X |

FOREIGN PATENTS

| 497,154 | 8/1950 | Belgium. |

DONALL H. SYLVESTER, *Primary Examiner.*

S. LEON BASHORE, *Examiner.*